United States Patent
Oran et al.

(10) Patent No.: US 9,906,447 B2
(45) Date of Patent: Feb. 27, 2018

(54) CACHING DATA IN AN INFORMATION CENTRIC NETWORKING ARCHITECTURE

(71) Applicant: Cisco Technology, Inc., San Jose, CA (US)

(72) Inventors: Dave Oran, Cambridge, MA (US); Mark Stapp, Belmont, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 217 days.

(21) Appl. No.: 14/733,849

(22) Filed: Jun. 8, 2015

(65) Prior Publication Data
US 2016/0014027 A1  Jan. 14, 2016

Related U.S. Application Data

(60) Provisional application No. 62/023,883, filed on Jul. 13, 2014.

(51) Int. Cl.
*H04L 12/747* (2013.01)
*H04L 12/725* (2013.01)
(Continued)

(52) U.S. Cl.
CPC ...... *H04L 45/742* (2013.01); *G06F 17/30887* (2013.01); *H04L 45/306* (2013.01);
(Continued)

(58) Field of Classification Search
CPC . H04L 45/742; H04L 45/306; H04L 67/2804; H04L 63/102; H04L 67/327;
(Continued)

(56) References Cited

U.S. PATENT DOCUMENTS 6,205,481 B1 * 3/2001 Heddaya ............. G06F 12/0813
707/E17.12
6,687,732 B1 * 2/2004 Bector ............. H04L 29/12009
709/200
(Continued)

FOREIGN PATENT DOCUMENTS

CN   103516606 A   1/2014
EP   2587773 A1   5/2013

OTHER PUBLICATIONS

Sillman, Dick, "CCNx 1.0 Implications for Router Design," Mar. 25, 2014, http://www.ccnx.org/pubs/hhg/5.1%20CCNx%201.0%20Implications%20for%20Router%20Design.pdf.*
(Continued)

*Primary Examiner* — Scott B Christensen
*Assistant Examiner* — Lam Do
(74) *Attorney, Agent, or Firm* — Ronald S. Fernando

(57) ABSTRACT

In one implementation, a method includes receiving, via a first information centric networking (ICN) interface, a first interest message comprising a first name of a first data object. The method also includes determining whether the first data object is stored within a cache of a router based on the first interest message. The method further includes updating, when the first data object is stored within the cache of the router, the first interest message with a first indicator indicating that the first data object is stored within the cache of the router. The method further includes transmitting, via a second ICN interface, the updated first interest message when the first data object is stored within the cache of the router.

20 Claims, 7 Drawing Sheets

(51) Int. Cl.
*H04L 29/08* (2006.01)
*H04L 29/06* (2006.01)
*G06F 17/30* (2006.01)
*H04L 12/927* (2013.01)

(52) U.S. Cl.
CPC .......... *H04L 47/808* (2013.01); *H04L 63/101* (2013.01); *H04L 63/102* (2013.01); *H04L 67/02* (2013.01); *H04L 67/10* (2013.01); *H04L 67/16* (2013.01); *H04L 67/2804* (2013.01); *H04L 67/2842* (2013.01); *H04L 67/327* (2013.01)

(58) Field of Classification Search
CPC ..... H04L 63/101; H04L 67/10; H04L 47/808; H04L 67/02; H04L 67/16; H04L 67/2842; G06F 17/30887
See application file for complete search history.

(56) References Cited

U.S. PATENT DOCUMENTS

| | | | | |
|---|---|---|---|---|
| 6,775,709 | B1* | 8/2004 | Elliott | H04Q 3/66 709/224 |
| 6,988,280 | B2* | 1/2006 | Burnett | G06F 21/10 709/229 |
| 7,188,216 | B1* | 3/2007 | Rajkumar | G06F 17/30902 707/E17.12 |
| 7,382,637 | B1* | 6/2008 | Rathnavelu | G11C 15/00 365/189.05 |
| 9,137,152 | B2* | 9/2015 | Xie | H04L 45/44 |
| 9,485,288 | B2* | 11/2016 | Kim | H04L 65/4084 |
| 2003/0097564 | A1* | 5/2003 | Tewari | H04L 12/14 713/171 |
| 2005/0138176 | A1* | 6/2005 | Singh | G06F 17/30902 709/226 |
| 2010/0057995 | A1* | 3/2010 | Cao | G06F 12/121 711/133 |
| 2010/0177642 | A1* | 7/2010 | Sebastian | H04L 12/1859 370/248 |
| 2011/0029641 | A1* | 2/2011 | Fainberg | G06F 17/30902 709/219 |
| 2011/0196941 | A1* | 8/2011 | Macwan | H04N 21/63 709/217 |
| 2012/0317307 | A1* | 12/2012 | Ravindran | H04L 12/6418 709/238 |
| 2013/0060962 | A1* | 3/2013 | Wang | H04L 67/327 709/238 |
| 2013/0179541 | A1* | 7/2013 | Chen | H04L 65/4084 709/219 |
| 2013/0219081 | A1 | 8/2013 | Qian et al. | |
| 2013/0227048 | A1 | 8/2013 | Xie et al. | |
| 2013/0242996 | A1* | 9/2013 | Varvello | H04L 67/327 370/392 |
| 2014/0023076 | A1* | 1/2014 | Calo | H04L 45/34 370/392 |
| 2014/0189060 | A1* | 7/2014 | Westphal | H04W 36/0016 709/217 |
| 2015/0039754 | A1* | 2/2015 | Gupta | H04L 41/147 709/224 |
| 2015/0149581 | A1* | 5/2015 | Brown | H04L 67/28 709/217 |
| 2015/0201033 | A1* | 7/2015 | Gupta | H04L 67/2842 709/213 |

OTHER PUBLICATIONS

Yuan, Haowei, Song, Tian, Crowley, Patrick, "Scalable NDN Forwarding: Concepts, Issues, and Principles," Jul. 30, 2012 http://ieeexplore.ieee.org/abstract/document/6289305/.*
Mogul, J.; Leach, P.; "Simple Hit-Metering and Usage-Limiting for HTTP," Oct. 1997 https://tools.ietf.org/html/rfc2227.*
Cisco, "Network Caching Technologies;" Feb. 18, 2011, http://docwiki.cisco.com/wiki/Network_Caching_Technologies.*
Oran, et al., Cisco, "NDN and IP Routing, Can It Scale?", Accessed on Aug. 5, 2014, 26 pages.
Wang, et al., "Scalable Name Lookup in NDN Using Effective Name Component Encoding", ICDCS 2012, 10 pages.
Meisel, et al., "Ad Hoc Networking via Named Data", MobiArch 2010, 6 pages.
Acs, et al., "Cache Privacy in Named-Data Networking", 2013, 11 pages.
Christian Dannewitz et al: "OpenNetInf—prototyping an information-centric Network Architecture", Local Computer Networks Workshops (LCN Workshops). 2012 IEEE 37TH Conference on, IEEE, Oct. 22, 2012, pp. 1061-1069, XP032321749, DOI: 10.1109/LCNW.2012.6424044, ISBN: 978-1-4673-2130-3.
International Preliminary Report on Patentability for PCT/US2015/037266 dated Jan. 17, 2017.

* cited by examiner

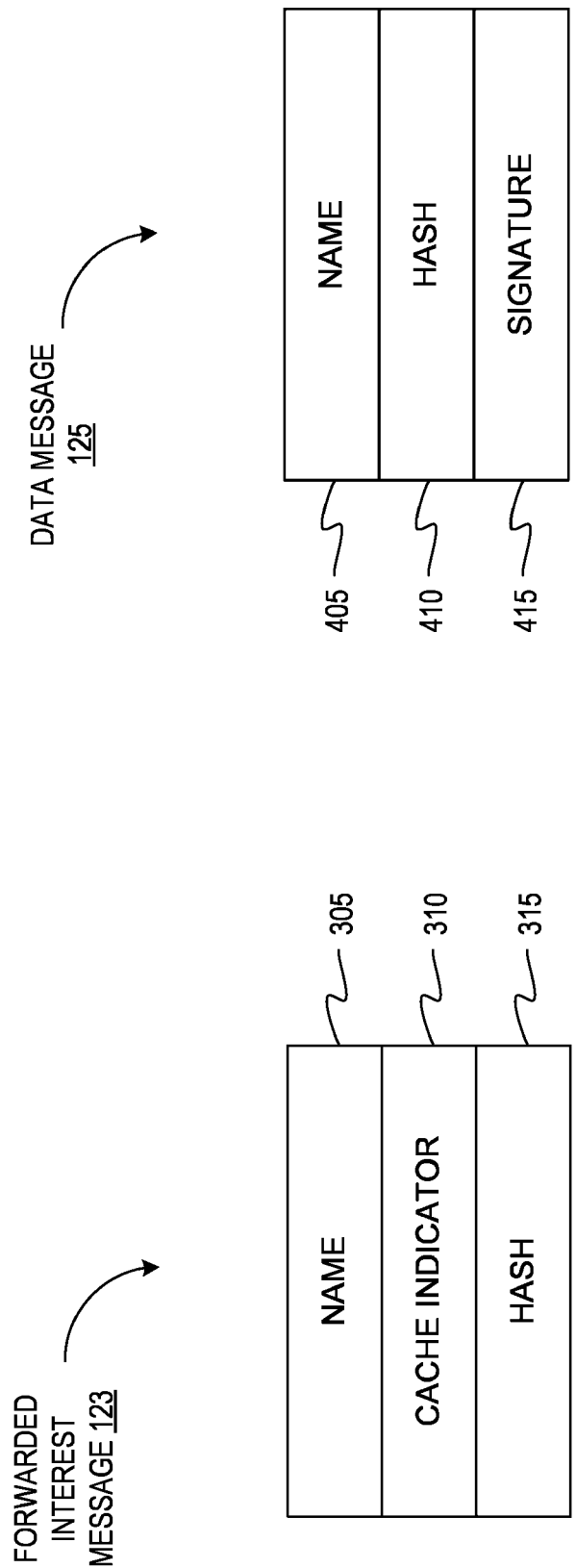

CACHING DATA IN AN INFORMATION CENTRIC NETWORKING ARCHITECTURE

RELATED APPLICATIONS

This application claims the benefit of priority under 35 U.S.C. § 119(e) of U.S. Provisional Application No. 62/023,883, filed on Jul. 13, 2014. All of the aforementioned applications are hereby incorporated by reference in their entireties for all purposes.

FIELD OF THE INVENTION

The present disclosure relates to Information Centric Networking (ICN) system architectures. More specifically, the present disclosure relates to methods and systems for caching data objects in an ICN system architecture.

BACKGROUND

In ICN system architectures, client devices (e.g., consumers or requestors) generally request data from servers (e.g., producers) using interest messages. The client devices transmit interest messages towards the server via one or more routers and the servers may transmit the requested data towards the client device using data objects (e.g., data messages). The interest messages may include names that may be used to identify data. The routers may use the names to transmit (e.g., forward or route) interest messages towards one or more servers that may have the data. The data objects also include the names of the data that is included in the data objects. The routers may also use the names to transmit (e.g., forward or route) data objects towards the client devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 3 is a block diagram illustrating an example forwarded interest message, in accordance with some embodiments.

FIG. 4 is a block diagram illustrating an example data message, in accordance with some embodiments.

Figure 1:
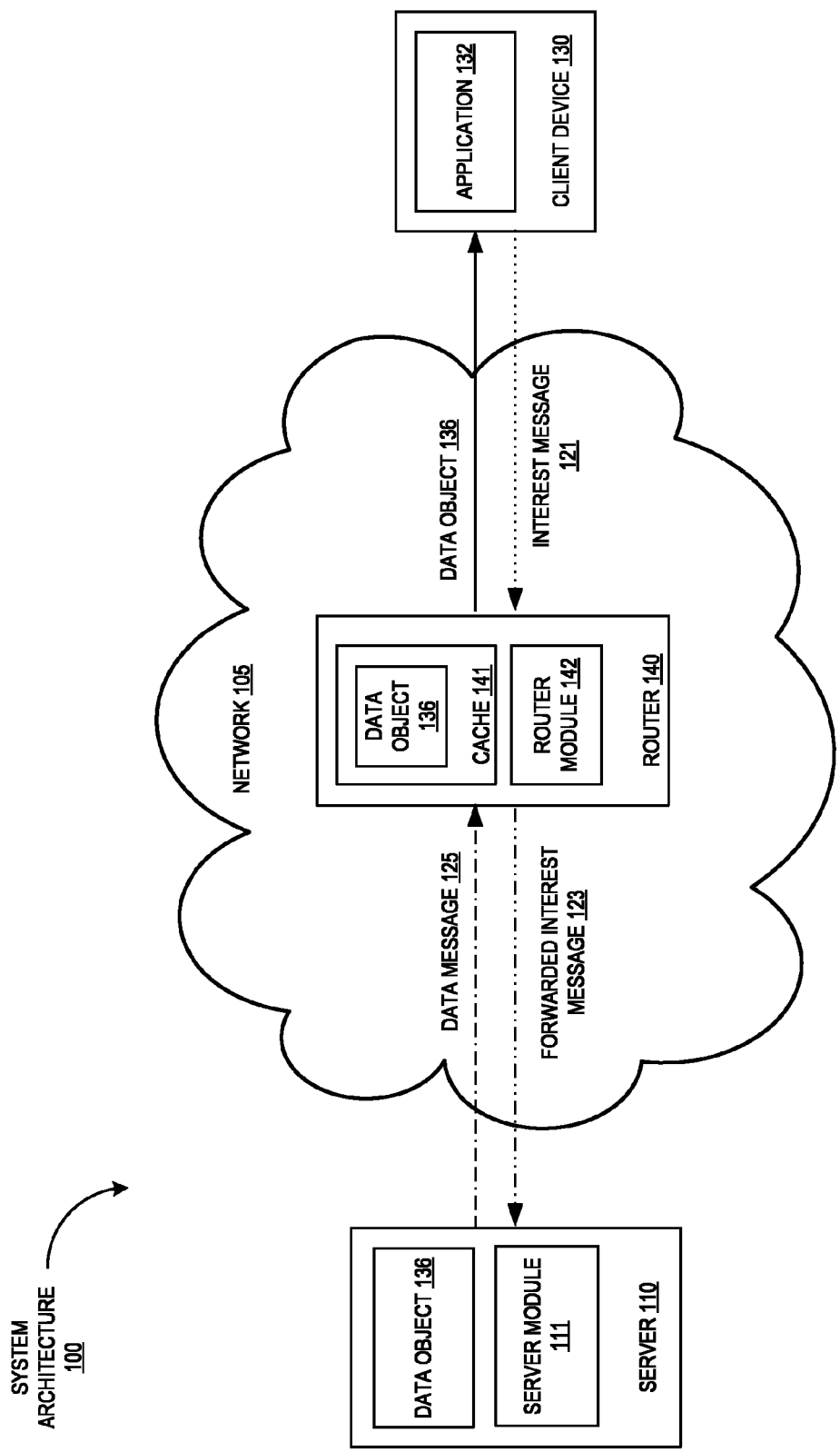
FIG. 1 is a block diagram illustrating a system architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for caching data objects in an ICN system architecture. For example, in some router implementations, a method includes receiving, via a first information centric networking (ICN) interface, a first interest message comprising a first name of a first data object. The method also includes determining whether the first data object is stored within a cache of a router based on the first interest message. The method further includes updating, when the first data object is stored within the cache of the router, the first interest message with a first indicator indicating that the first data object is stored within the cache of the router. The method further includes transmitting, via a second ICN interface, the updated first interest message, when the first data object is stored within the cache of the router.

In other server implementations, a method includes receiving, via an information centric networking (ICN) interface, a first interest message comprising a first name of a first data stored on a server. The method further includes transmitting, via the ICN interface, a first data object based on the first interest message, wherein the first data object comprises the first data and a first parameter indicating that a router is to forward additional interest messages to the server when the router receives the additional interest messages comprising the first name and when the first data is stored in a cache of the router.

DETAILED DESCRIPTION

Information Centric Networking (ICN) system architectures are increasing in popularity. Examples of ICN system architectures include the Named Data Networking (NDN) system architecture and the Content-Centric Networking (CCN) system architecture. As discussed above, an ICN system architecture (such as an NDN system architecture) may allow a consumer (e.g., a client device) to request data using interest messages that identify the name of the requested data. A producer (e.g., a producer or provider of the requested data, such as a server computing device) may receive the interest messages and may transmit data objects (in response to the interest messages) to the consumer. The interest messages and/or data objects are routed and/or forwarded by routers through the ICN system architecture using the names in the interest messages and data objects. Transmitting an interest message to request a data object and receiving the data object may be referred to as an Interest-Data exchange.

An ICN system architecture (such as an NDN system architecture) may allow the routers that route/forward interest messages and/or data objects to store (e.g., cache) NDN data objects in their respective caches. When a router receives a request (e.g., an interest packet) for a data object and the router has the data object stored in its cache, the router may transmit the NDN data object from cache in response to the request instead of forwarding the request toward a server. Because the interest message is not forwarded towards the server, the server is unable to track the number of interest messages that requested the data object. This may cause issues and/or problems with various applications and services. For example, advertisement trackers (e.g., advertising tracking applications/services) would be unable to determine the total number of clicks for an advertisement.

In some embodiments, a system architecture may use an NDN system architecture. In the NDN system architecture disclosure herein, data objects may include various parameters that indicate that a router should continue to forward an interest message when a matching data object is stored within the cache of the router. The forwarded interest message may include indicators/values to indicate that a data object was found in the cache of a router on the path to the server or servers holding the data object. These parameters, indicators, and/or values may allow the server to track/manage the interest messages (received from client devices) and/or data messages (that are stored on caches and transmitted to client devices).

Although the present disclosure may refer to the NDN system architecture, it should be understood that the NDN system architecture is merely an example architecture that may be used. Other embodiments may use other types of system architectures (e.g., CCN, Pursuit, NetInf, etc.) and the examples, implementations, and/or embodiments described herein may be used with the other types of system architectures.

FIG. 1 is a block diagram illustrating a system architecture 100, in accordance with some embodiments. The system architecture includes a server 110, a client device 130, a network 105, and a router 140. The system architecture 100 may be an NDN system architecture. For example, a consumer (e.g., client device 130) in the system architecture 100 may use interest messages to request data and a producer (e.g., server 110) may use may use data objects (e.g., NDN data objects) to transmit the requested data. The server 110 may be referred to as a producer (or provider) and the client device 130 may be referred to as a consumer (or a requestor).

The server 110 may be one or more computing devices (such as a rack-mount server, a router computer, a server computer, a personal computer, a mainframe computer, a smartphone, a personal digital assistant (PDA), a laptop computer, a tablet computer, a desktop computer, etc.). The client device 130 may also be a computing device (e.g., a personal computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

As illustrated in FIG. 1, the server 110 includes a data object 136. For example, the data object 136 may reside (e.g., may be stored) on a memory (e.g., a hard disk, a solid state disk, etc.) of the server 110. In other embodiments, the data object 136 may reside on a data store (e.g., a separate computing device with a memory, a hard disk, a solid state disk, etc.), that may be separate from the server 110. The data object 136 may be content or data that may be owned, managed, and/or administered by the server 110. For example, the data object 136 may be a file, an image, a movie, a portion of a movie, a portion of a file, etc. The server 110 may provide the data object 136 to client devices (e.g., client device 130) that request the data object 136 (e.g., that transmit an interest message with the name of the data object 136). The server 110 also includes a server module 111. In one embodiment, the data object 136 may be an NDN data object, a CCN data object, etc.

The system architecture 100 also includes router 140. Router 140 may be a communication device (e.g., a computing device such as a router, a switch, etc.) that may route and/or forward data between the server 110 and the client device 130. For example, router 140 may receive interest messages (e.g., requests for data/content) from the client device 130 and may forward the interest messages toward the server 110. The server 110 may transmit data objects to the client device 130 (in response to the interest messages) via the router 140. The router 140 may include a cache 141. The router 140 may also include multiple network interfaces (e.g., multiple network ports and/or network connections). The router 140 may receive interest messages (e.g., NDN interest messages, CCN interest messages, etc.) and may forward/route interest messages between computing devices (e.g., between client device 130 and a server 110). For example, the router 140 may receive an interest message at a first network interface (e.g., a first port) and may forward/route the interest message using a second network interface (e.g., a second port). In one embodiment, the router 140 may forward/route the interest message using multiple network interfaces (e.g., multiple ports). For example, the router 140 may forward/route the interest message using any number of network interfaces other than the network interface on which the interest message was received (e.g., the first network interface/port). The router 140 may also receive data objects in response to the interest messages and may forward/route data objects (e.g., NDN data objects, CCN data objects) between computing devices. For example, the router 140 may receive a data object at the second network interface and may forward/route the data object using the first network interface.

The router 140 may include a forwarding information base (FIB). The FIB (not shown in the figures) may be populated by a name-based routing protocol. The FIB may indicate which network interface(s) of the router 140 should be used to forward/route an interest message based on prefixes and/or portions of the name in the interest message. For example, an interest message may include the name "/company1/video/video1." The FIB may indicate that interest messages with a prefix of "/company1" should be forwarded/routed to the first network interface (e.g., transmitted through the first network interface). The router 140 may also be statically configured to route different prefixes and/or portions of names to different network interfaces. The router 140 may also include a pending interest table (PIT). The PIT (not shown in the figures) may store a list of the interest messages that are waiting for returning data objects (e.g., a list of interest messages that have not been satisfied). In one embodiment, the router 140 may aggregate interest messages with matching names received from different network interfaces (e.g., different ports). When the router 140 aggregates interest messages, the router 140 may not create a separate entry in the PIT when an interest message with a name that matches an entry in the PIT is received. Instead, the router 140 may update the matching entry to indicate which network interface the interest message was received from.

The system architecture 100 may allow the router 140 to store (e.g., cache) NDN data objects in the cache 141. For example, when a router 140 receives an initial request (e.g., an interest packet) for the data object 136 from the client device 130 (or another client device) and the router does not have the data object 136 in the cache 141, the router 140 may forward the initial interest message toward the server 110. The server 110 may receive the initial interest message and may transmit the data object 136 to the router 140. When the router 140 receives the data object 136 (for the first time), the router 140 may store the data object 136 in the cache 141 and may forward the data object 136 to the client device 130. When the router 140 receives subsequent interest messages for the data object 136, the router 140 may already have the data object 136 stored in its cache 141. In a general NDN system architecture, the router 140 may transmit the data object 136 stored in the cache 141 toward the client device 130 in response to the request, instead of forwarding the request toward the server 110. This may improve latency and may reduce the amount of network congestion in the network 105. In one embodiment, the caches 141 may also allow multi-path and multi-destination routing without using domain name system (DNS) lookups, load balancers, and proxies.

General NDN system architectures may have no provision for the server 110 to track and/or monitor interest messages (for data objects) transmitted by client devices when routers have the data objects (requested by the interest messages) in their respective caches. As discussed above, in a general NDN architecture, a router that has a data object stored in cache may transmit the requested object toward a client device rather than forwarding the interest message toward a server. This may cause the server 110 to be unable to track and/or monitor interest messages for a data object because the server will not receive interest messages for the data object from routers once the routers store the data object in their caches. For example, the router 140 may already have the data object 136 stored in its cache 141. The data object 136 may have been received by the router 140 from a previous Interest-Data exchange (e.g., with client device 130 or another client device). As illustrated in FIG. 1, the server 110 includes a server module 111 and the router 140 includes a router module 142. In one embodiment, the server module 111 and/or the router module 142 may allow the server 110 to track and/or monitor interest messages for data objects even though router 140 may have the data objects stored in cache 141.

In one embodiment, the server module 111 may include one or more parameters in the data object 136 when the server module 111 transmits the data object 136 in response to an interest message. The server module 111 may include a first parameter (e.g., a forwarding parameter illustrated in FIG. 2) in the data object 136 that may indicate to the router 140 that the router 140 should transmit the forwarded interest message 123 towards the server 110 when the router 140 receives an interest message 121 for the data object 136 and when the router 140 has the data object 136 stored in its cache 141. In one embodiment, the router 140 may transmit the forwarded interest message 123 using multiple network interfaces (e.g., multiple ports). For example, the router 140 may transmit multiple forwarded interest messages 123 using any number of network interfaces other than the network interface on which the interest message 121 was received (e.g., a first network interface/port). In one embodiment, the forwarded interest message 123 includes a value, a field, an indicator, and/or data indicating that the router 140 has the data object 136 stored in its cache 141 (as discussed in more detail below). The forwarded interest message may also include other values, fields, indicators, and/or data (as discussed in more detail below). The forwarded interest message 123 may allow the server 110 to monitor and/or track interest messages for the data object 136.

The server module 111 may also include a second parameter (e.g., a data return parameter illustrated in FIG. 2) in the data object 136 that may indicate to the router 140 when the router 140 should transmit the data object 136 requested by the interest message 121 to the client device 130. For example, the second parameter may indicate that the router 140 may transmit the data object 136 upon receiving the interest message 121 (as discussed in more detail below). In another example, the second parameter may indicate that the router 140 should wait for a response (e.g., data message 125) from the server 110 before transmitting the data object 136 (as discussed in more detail below). In a further example, the second parameter may indicate that the router 140 should transmit the data object 136 if a response (e.g., data message 125) is not received from the server 110 within a time period (as discussed in more detail below).

In one embodiment, the server module 111 may also generate data message 125 and may transmit the data message 125 towards the router 140 when the server 110 receives the forwarded interest message 123. The data message 125 may allow the router 140 to follow the convention of the Interest-Data exchange for the interest message 121 (e.g., receive a data object in response to an interest message). Rather than including the data object 136 in the data message 125, the server module 111 may include a hash (e.g., a hash value generated using a hashing function such as SHA-1, MD5, etc.) of the data object 136 in the data message 125. The data message 125 may also include a signature generated by the server module 111. For example, the server module 111 may sign the data message 125 (e.g., may generate a signature and may include the signature in the data message 125). In one embodiment, the data message 125 may be a data object (e.g., an NDN data object, a CCN data object, etc.). The name of the data object may be the same as the name in the forwarded interest message 123 and the content/payload of the data object may be the hash of the data object identified by the name in the forwarded interest message 123 (e.g., a hash of data object 136).

In one embodiment, the server module 111 may also track/monitor interest messages, forwarded interest message, and/or data objects. For example, the server module 111 may count the number of interest messages that are received to determine the total number of requests for different data objects. In another example, the server module 111 may analyze a hop value or counter within the forwarded interest messages. The hop value or counter may be used to determine the first router along a path of routers between the client device 130 and the server 110 that had the data object 136 stored in its cache (as discussed in more detail below). In a further example, the server module 111 may detect errors in the data objects stored in the caches of routers. For example, if a hash in the forwarded interest message 123 does not match a hash of the data object 136 generated by the server module 111, the server module 111 may determine that the data object 136 stored in the cache 141 has an error (e.g., the data object 136 has been corrupted, modified, etc.). In one embodiment, the server module 111 may transmit a correct version of the data object 136 towards the router 140 so that the router 140 may update the incorrect version of the data object 136 stored in the cache 141.

As discussed above, the router 140 may include a router module 142. The router module 142 may forward the interest messages, data messages, and/or data objects between the client device 130 and the server 110. The router module 142 may receive data object 136 from the server 110 as the result of a previous Interest-Data exchange between the server 110 and client device 130 (or another client device). The data object 136 may include a first parameter indicating that the router 140 should forward subsequent interest messages 123 towards the server 110 when the router 140 receives an interest message for the data object 136 and when the router 140 has the data object 136 stored in its cache 141. In one embodiment, the router module 142 may process the interest message 121 using the PIT and the FIB. For example, the router module 142 may access the FIB to determine which network interface (e.g., which network port or network connection) should be used to forward the interest message 121 towards the server. In another example, the router module 142 may update the PIT to indicate the router 140 is waiting for the data object for the interest message 121.

In one embodiment, the router module 142 may update or modify the interest message 121 resulting in the forwarded interest message 123 when the router module receives interest message 121, based on the first parameter of the data object 136. For example, the router module 142 may add additional fields, values, and/or data to the interest message 121 resulting in the forwarded interest message 123. In one embodiment, the forwarded interest message 123 may be a new interest message generated by the router 140 (rather than modifying or updating interest message 121). As discussed above, the forwarded interest message 123 may include values, fields, indicators, and/or data in addition to the name of the data object 136. In one embodiment, the forwarded interest message 123 may include a value, a field, an indicator, and/or data indicating that the router 140 has the data object 136 stored in its cache 141. For example, the forwarded interest message 123 may include a flag with the value "1" to indicate that router 140 has the data object 136 stored in its cache. In another embodiment, the forwarded interest message 123 may also include a hash of the data object 136. For example, the router module 142 may generate a hash (e.g., a hash value) of the data object 136 using a hashing function/algorithm (e.g., SHA-1, MD5, etc.) and may include the hash in the forwarded interest message 123. In another example, the router module 142 may obtain a previously generated hash value of the data object 136 and may include the hash in the forwarded interest message 123. The forwarded interest message 123 may also include other values, fields, indicators, and/or data. For example, ICN protocol system architectures may include a hop limit field/parameter in an interest message to control loops and limit propagation distance (e.g., the number of times an interest message may be forwarded). The forwarded interest message 123 may include a field, value, parameter, etc., that may indicate value of the hop limit field/parameter at a first router (along of path of routers) that had the data object 136 in its cache (e.g., may be used to identify the closest router to the client device 130 with the data object 136). This may allow the server 110 to determine how close the data object 136 is to the client device 130 and may allow the server 110 to determine how effective the routers within the network 105 are at caching data objects.

As discussed above, the data object 136 may also include a second parameter (that that may indicate when the router 140 should transmit the data object 136 to the client device 130. In one embodiment, the second parameter may indicate that the router 140 may transmit (e.g., forward) the data object 136 towards the client device 130 when the interest message 121 is received. For example, the router 140 may transmit the data object 136 towards the client device 130 immediately (or shortly) after receipt of the interest message 121 (e.g., without waiting for data message 125). Transmitting the data object 136 before receiving the data message 125 may allow the router 140 to reduce the delay in responding to the interest message 121.

In another embodiment, the second parameter may indicate that the router 140 should wait for the data message 125 before transmitting the data object 136 toward the client device 130. For example, the router 140 may not be allowed to transmit the data object 136 (e.g., may refrain from transmitting the data object 136) unless the router 140 receives the data message 125 within a time period (e.g., a timeout period such as five seconds). The data message 125 may include a hash of the data object 136 instead of the data objet 136 (as discussed above). The router 140 may not receive the data message 125 due to various reasons and/or errors. For example, there may be a routing failure in the network 105 that prevents the forwarded interest message 123 from reaching the server 110. In another example, there may be congestion in the network 105 that may cause the forwarded interest message 123 to be dropped. In a further example, the server 110 may be down (e.g., may have crashed, may be inoperable, may be malfunctioning, etc.).

If the data message 125 is received within the time period, the router module 142 may process of the data message 125 using the PIT and FIB. For example, the router 140 may update and/or remove entries in the PIT when the data message 125 is received. The router 140 may also transmit (e.g., forward) the data object 136 towards the client device 130. If the data message 125 is not received within the time period, the router module 142 may propagate the error (e.g., transmit a message indicating that an error occurred) towards the client device 130, rather than transmitting the data object 136 (stored in the cache 141) towards the client device 130. Waiting for the data message 125 (before transmitting the data object 136) may allow the router 140 to replicate the delay in transmitting the data object 136 when the data object 126 is not stored in the cache 141. Propagating the error towards the client device 130 may allow the router 140 to operate or behave as if the data object 136 was not stored in the cache 141. This may allow the system architecture to prevent the data object 136 from being transmitted to the client device 130 when the server 110 is down or unreachable (e.g., an error prevents the server 110 from receiving the forwarded interest message 123 or transmitting the data message 125).

In a further embodiment, the second parameter may indicate that the router should wait for the data message 125 for a time period. If the data message 125 is not received within the time period, the router 140 may transmit the data object 136 towards the client device 130 after the time period (e.g., timeout period) expires. For example, if the data message 125 is not received after five seconds (e.g., the timeout period), the router 140 may transmit the data object 136 towards the client device 130. As discussed above, the router 140 may not receive the data message 125 due to various reasons and/or errors. Allowing the router 140 to transmit the data object 136 after the time period expires (rather than refraining from transmitting the data object 136) may allow the system architecture 100 to more reliably provide data objects to client devices while providing the server 110 with the ability to track and/or monitor the interest messages successfully received from client devices.

In other embodiments, the system architecture 100 may include additional routers (not shown in the figures) in the network 105 (e.g., between the server 110 and the client device 130). If an additional router receives a forwarded interest message 123, the additional router may perform normal processing of the forwarded interest message 123 using the PIT and FIB. For example, the additional router may add an entry in the PIT (or update an entry if the additional router is configure to aggregate interest messages) and may use the FIB to determine which network interface of the additional router should be used to transmit the forwarded interest message 123. If the additional router receives the data message 125, the additional router may also perform normal processing of the data message 125 using the PIT and FIB. For example, the additional router may determine which network interface of the additional router should be used to transmit the data message 125 using the PIT and may update and/or remove entries in the PIT when the data message 125 is received. The additional router may also transmit (e.g., forward) the data message 125 towards the client device 130.

In one embodiment, the system architecture 100 may allow the server 110 to track/manage the interest messages and/or data objects (as if the data was not stored in the cache 141 of the router 140) while allowing the router 140 (and additional routers) to reduce the congestion or bandwidth usage of the network 105 by transmitting data objects from the cache 141 (rather than requesting the data objects from the server 110). The system architecture 100 may allow the router 140 to return data immediately (or shortly after) receiving the interest message 121 thereby mimicking general NDN behavior while still being able to inform the server 110 of each arriving interest message when possible. The system architecture 100 may also allow data object 136 to be returned from the cache when either data message 125 arrives or when an error occurs. The system architecture 100 may further allow the data object 136 to be returned only when the server 110 is reachable and responds.

Although FIG. 1 may refer to the NDN system architecture, it should be understood that the NDN system architecture is merely an example architecture that may be used. Other embodiments, may use other types of system architectures (e.g., CCN, Pursuit, NetInf, etc.). For example, the embodiments, implementations, and/or examples described herein may be applicable to any ICN system architecture that uses Interest-Data exchanges to transmit data between clients (e.g., consumers) and server (e.g., producers). In another example, the embodiments, implementations, and/or examples described herein may be applicable to any ICN system architecture that allows routers to cache data objects and allows routers to respond to interest messages using data objects stored in cache.

Figure 2:
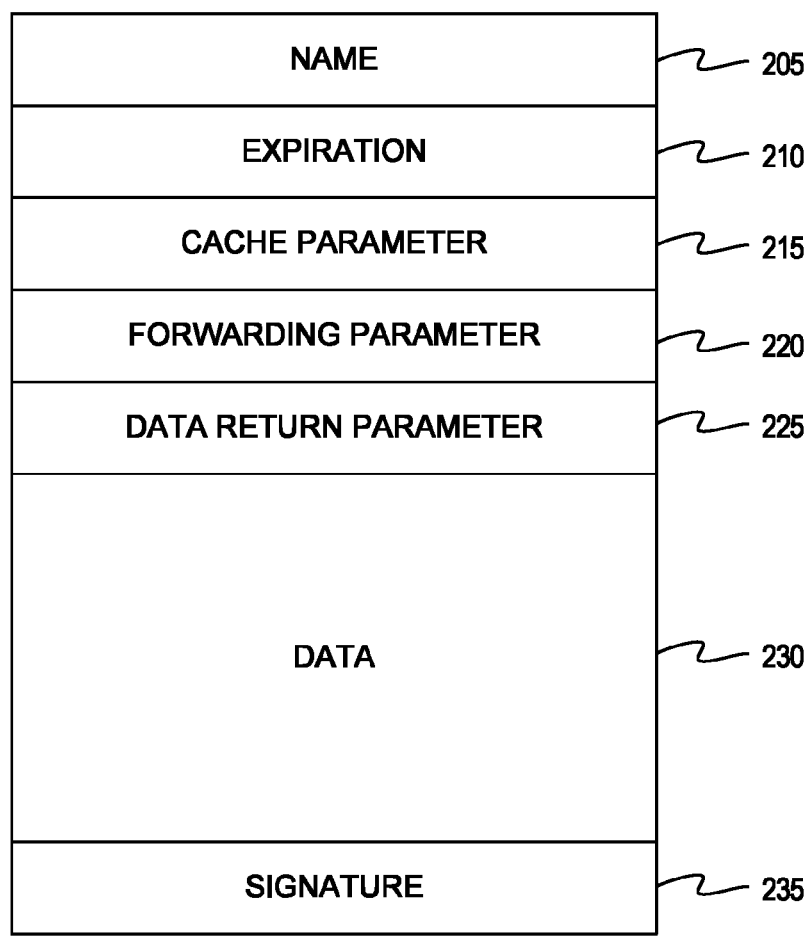
FIG. 2 is a block diagram illustrating an example data object, in accordance with some embodiments.

FIG. 2 is a block diagram illustrating an example data object 136, in accordance with some embodiments. As discussed above in conjunction with FIG. 1, a server (e.g., server 110 or server module 111 illustrated in FIG. 1) may generate and/or store the data object 136. The data object 136 includes a name 205, an expiration 210, a cache parameter 215, a forwarding parameter 220, a data return parameter 225, data 230, and a signature 235. In other embodiments, the data object 136 may include different combinations of the above-referenced items.

In one embodiment, the name 205 may identify the data 230 and/or the data object 136. In another embodiment, the expiration 210 may indicate an amount of time (or a period of time) that the data object 136 may remain valid. For example, the expiration 210 may indicate that a router should delete the data object 136 after a period of time (e.g., after one day) and/or may indicate that the data may not be considered valid after the period of time. In one embodiment, the cache parameter 215 may indicate whether a router is allowed to cache the data object 136. For example, the cache parameter 215 may be a flag where the value "0" indicates that a router is not allowed return a cached copy of the data object 136 and where the value "1" indicates that the router is not allowed return a cached copy of the data object 136.

In one embodiment, the signature 235 may securely bind one or more of the name 205, the expiration 210, the cache parameter 215, the forwarding parameter 220, the data return parameter 225, and the data 230. For example, the signature 235 may be generated using a private key (e.g., a secret key) and one or more of the name 205, the expiration 210, the cache parameter 215, the forwarding parameter 220, the data return parameter 225, and the data 230. The signature 235 may allow the router and/or client device to determine and/or confirm the identity of the server.

FIG. 3 is a block diagram illustrating an example forwarded interest message 123, in accordance with some embodiments. As discussed above in conjunction with FIG. 1, a router (e.g., router 140 or router module 142 illustrated in FIG. 1) may generate and/or transmit the forwarded interest message 123 toward a server. The forwarded interest message 123 includes a name 305, a cache indicator 310, and a hash 315. In other embodiments, the forwarded interest message 123 may include different combinations of the above-referenced items. For example, the hash 315 may be optional in the forwarded interest message 123.

In one embodiment, the name 305 may identify the data and/or a data object requested by a client device (e.g., data object 136). For example, referring to FIG. 1, the name 305 may identify the data object 136 stored on the server 110. In one embodiment, the cache indicator 310 may indicate that the data object identified by the name 305 is stored in the cache of the router. The cache indicator 310 may also indicated and/or provide additional information to the server. For example, the cache indicator 310 may also be used to indicate a current hop count or hop value. In one embodiment, the hash 315 may be a hash of the data object identified by the name 305. For example, the hash 315 may be a hash value generated using a hashing function/algorithm (e.g., SHA-1) and the data object identified by the name 305.

FIG. 4 is a block diagram illustrating an example data message 125, in accordance with some embodiments. As discussed above in conjunction with FIG. 1, a server (e.g., server 110 or server module 111 illustrated in FIG. 1) may generate and/or transmit the data message 125 toward a client device. The data message 125 includes a name 405, a hash 410, and a signature 415. In other embodiments, the data message 125 may include different combinations of the above-referenced items. For example, the signature 415 may be optional in the data message 125.

In one embodiment, the name 405 may identify the data and/or a data object requested by a client device and/or stored in a cache on a router (e.g., data object 136). For example, referring to FIG. 1, the name 405 may identify the data object 136 stored on the server 110 and on the cache 141 of the router 140. In one embodiment, the hash 410 may be a hash of the data object identified by the name 405. For example, the hash 410 may be a hash value generated using a hashing function/algorithm (e.g., SHA-1) and the data object identified by the name 405. In one embodiment, the signature 415 may securely bind one or more of the name 405 and the hash 410. For example, the signature 415 may be generated using a private key (e.g., a secret key) and one or more of the name 405 and the hash 410. The signature 415 may allow the router and/or client device to determine and/or confirm the identity of the server.

Figure 5:
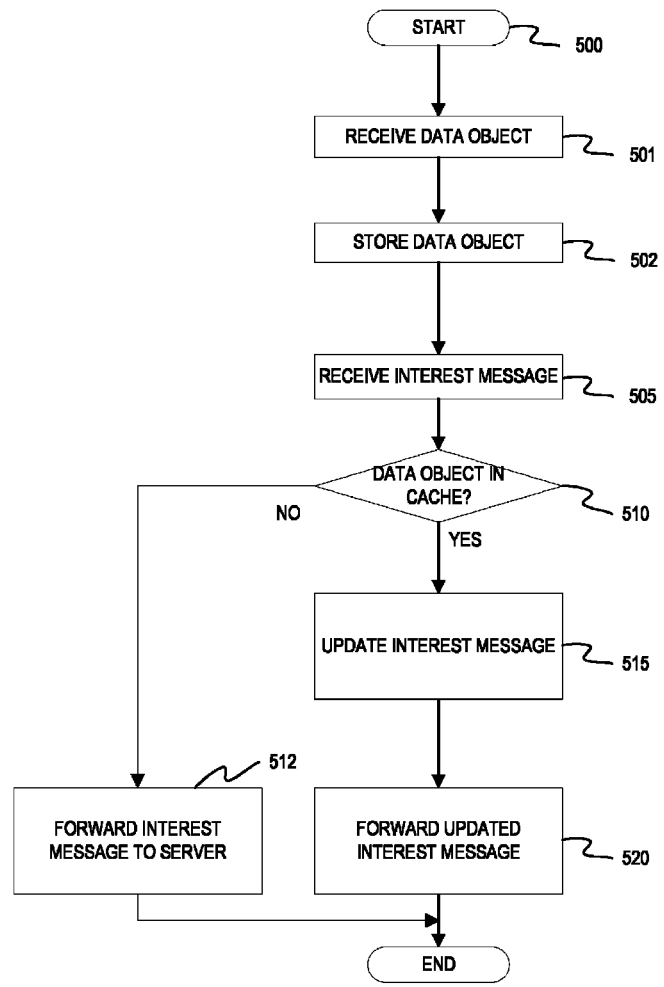
FIG. 5 is a flowchart representation of a method of generating and/or transmitting a forwarded interest message, in accordance with some embodiments.

FIG. 5 is a flowchart representation of a method 500 of generating and/or transmitting a forwarded interest message, in accordance with some embodiments. In some implementations, the method 500 may be performed by a router and/or a router module (e.g., router 140 and/or router module 142 illustrated in FIG. 1). Briefly, method 500 includes receiving an interest message, determining whether a data object is stored in cache, and transmitting a forwarded interest message. The method 500 begins at block 501 where the method 500 receives a data object. For example, the method 500 may receive the data object as part of an earlier Interest-Data exchange (as discussed above) with a server. At block 502, the method 500 stores the data object in a cache of a router. The method 500 receives an interest message requesting the data object at block 505. For example, the method 500 may receive an interest message from a client device or from another router. The interest message may include the name of a data object (e.g., as discussed above). At block 510, the method 500 may determine whether the data object identified by the name in the interest message, is stored in a cache of the router.

If the data object data object identified by the name in the interest message is not stored in a cache of the router, the method 500 may transmit (e.g., forward) the interest message towards the server at block 512. If the data object identified by the name in the interest message is stored in a cache of the router, the method 500 updates (e.g., modifies) the interest message at block 515. For example, referring to FIG. 3, the method 500 may update the interest message to include one or more parameters, values, fields, etc., (e.g., may update interest message 121 resulting in forwarded interest message 123, as illustrated in FIG. 1). The method 500 transmits the updated interest message towards the server at block 520. In one embodiment, the method 500 may transmit the updated interest message towards the server using multiple network interfaces (e.g., multiple ports). For example, the method 500 may transmit the updated interest message using any number of network interfaces other than the network interface on which the interest message was received (at block 505).

Figure 6:
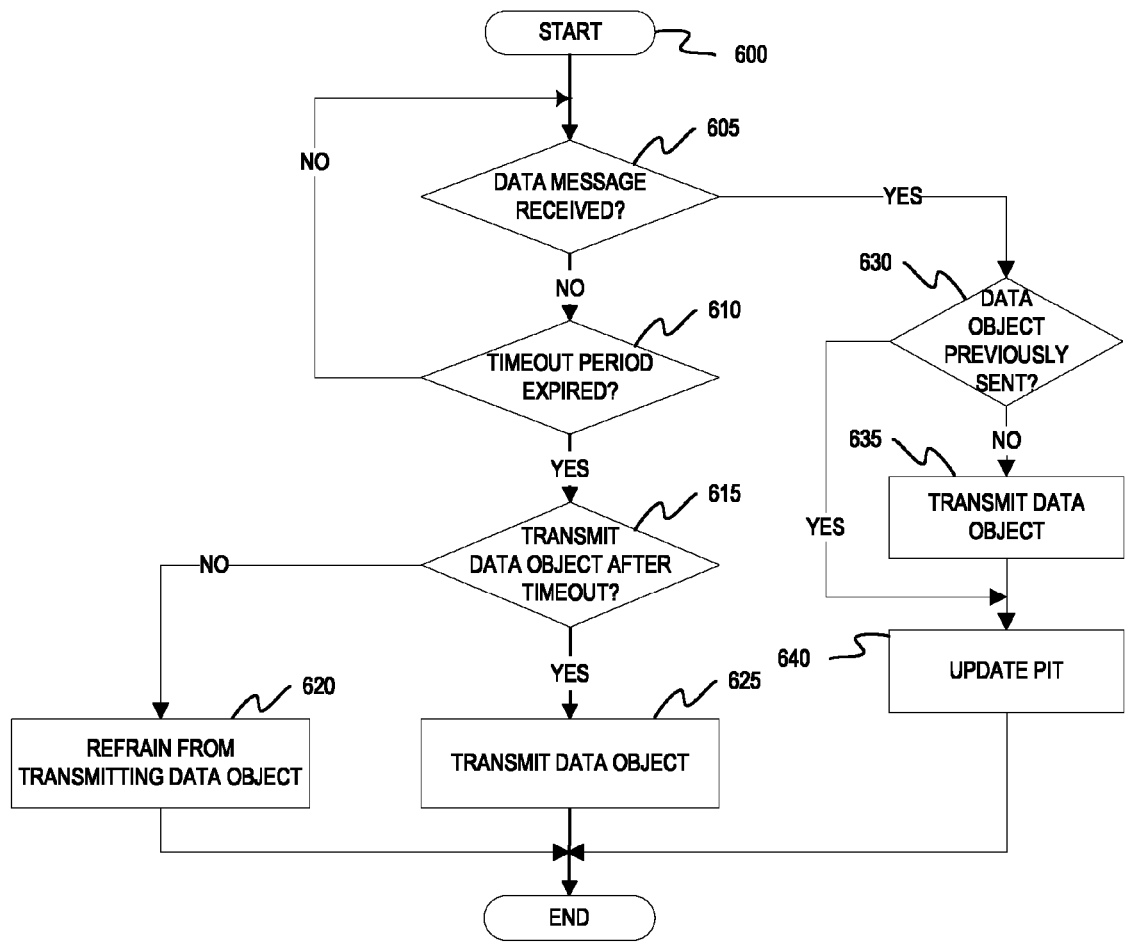
FIG. 6 is a flowchart representation of a method of transmitting a data object, in accordance with some embodiments.

FIG. 6 is a flowchart representation of a method 600 of transmitting a data object, in accordance with some embodiments. In some implementations, the method 600 may be performed by a router and/or a router module (e.g., router 140 and/or router module 142 illustrated in FIG. 1). Briefly, method 600 includes determining whether a data message is received and determining whether to transmit the data object. The method 600 begins at block 605 where the method 600 determines whether a data message was received. For example, referring to FIG. 4, the method 600 may determine whether the data message 125 was received. The data message may include the name of the data object. If the data message was received, the method 600 determines (at block 630) whether the data object data object identified in the data message was previously transmitted or sent towards a client device. For example, referring back to FIG. 2, the method 600 may analyze the data return parameter 225 to determine if the data object was transmitted without waiting for the data message. If the data object identified in the data message was not previously transmitted or sent towards the client device, the method 600 may transmit the data object towards the client device at block 635. If the data object identified in the data message was previously transmitted or sent towards the client device, the method 600 may update a PIT of a router. For example, the method 600 may update an entry in a PIT to indicate that an interest message has been satisfied (as discussed above).

If the data message has not been received, the method 600 determines whether a timeout period (e.g., a time period) has expired at block 610. If the timeout period has not expired, the method 600 may continue to block 605. If the timeout period has expired, the method 600 may determine whether to transmit the data object towards the client device after the timeout period has expired at block 615. For example, referring back to FIG. 2, the method 600 may analyze the data return parameter 225 to determine if the data object should be transmitted towards the client device even though the timeout period has expired. If the data object should be transmitted towards the client device after the timeout period has expired, the method 600 may transmit the data object towards the client device at block 625. If the data object should not be transmitted towards the client device after the timeout period has expired, the method 600 may refrain from transmitting the data object towards the client device at block 620.

Figure 7:
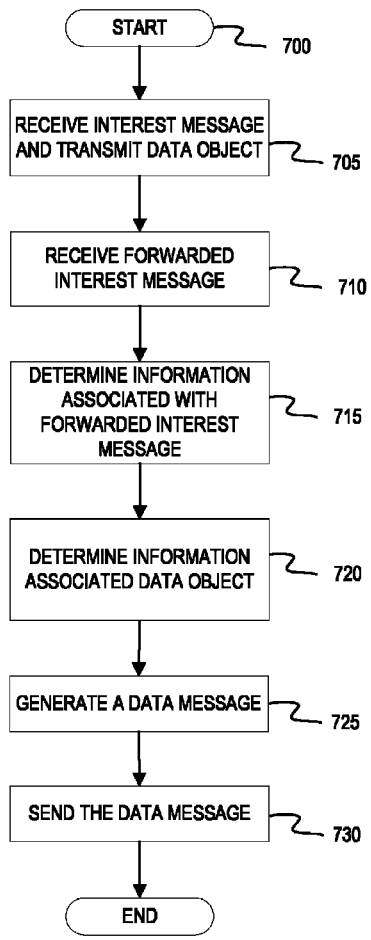
FIG. 7 is a flowchart representation of a method of generating and/or transmitting a data message, in accordance with some embodiments.

FIG. 7 is a flowchart representation of a method of generating and/or transmitting a data message, in accordance with some embodiments. In some implementations, the method 700 may be performed by a server and/or a server module (e.g., server 110 and/or server module 111 illustrated in FIG. 1). Briefly, method 600 includes receiving a forwarded interest message, generating a data message, and transmitting the data message. The method 700 begins at block 705 where the method 700 receives an interest message for a data object and transmits the data object in response to the interest message. For example, a first client device may transmit the interest message (with the name of the data object) and the method 700 may transmit the data object towards the first client device in response to the interest message. The data object may include various data, fields, values, and/or parameters as discussed above and as illustrated in FIG. 2.

At block 710, the method 700 receives a forwarded interest message. For example, referring to FIGS. 1 and 3, the method 700 may receive the forwarded interest message 123. At block 715, the method 700 may determine information associated with the forwarded interest message. For example, the method 700 may increment a total number of interest messages received for the data object, by one. The method 700 may also determine information associated with the data object identified by the forwarded interest message at block 702. For example, the method 700 may analyze a hash in the forwarded interest message to determine if a copy of the data object stored in a cache of a router has an error. At block 725, the method 700 generates a data message. For example, referring to FIGS. 1 and 4, the method 700 may generate data message 125. The data message 125 may include various data, fields, values, and/or parameters as illustrated in FIG. 4 and as discussed above. The method 700 may transmit the data message 125 towards the client device at block 730.

Figure 8:
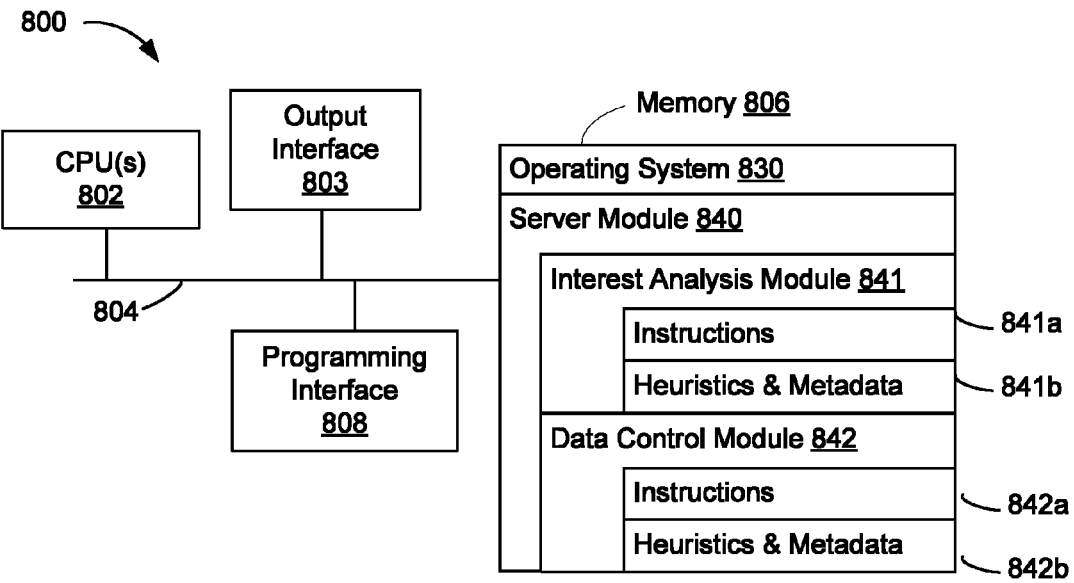
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a server module 840. In some embodiment, one or more instructions are included in a combination of logic and non-transitory memory. The operating system 830 includes procedures for handling various basic system services and for performing hardware dependent tasks. In some embodiments, the server module 840 may be configured to generate data objects, receive interest messages, transmit data objects, receive forwarded interest messages, generate data messages, and/or transmit data messages. To that end, the server module 840 includes interest analysis module 841 and data control module 842.

In some embodiments, the interest analysis module 841 may receive interest messages, receive forwarded interest messages, and/or determine information (e.g., detect errors in data objects, determine hop values or counts). To that end, the interest analysis module 841 includes a set of instructions 841*a* and heuristics and metadata 841*b*. In some embodiments, the data control module 842 may generate data objects, transmit data objects, generate data messages, and/or transmit data messages. To that end, the data control module 842 includes a set of instructions 842*a* and heuristics and metadata 842*b*.

Although the server module 840, the interest analysis module 841, and the data control module 842 are illustrated as residing on a single computing device 800, it should be understood that in other embodiments, any combination of the server module 840, the interest analysis module 841, and the data control module 842 may reside on separate computing devices.

Figure 9:
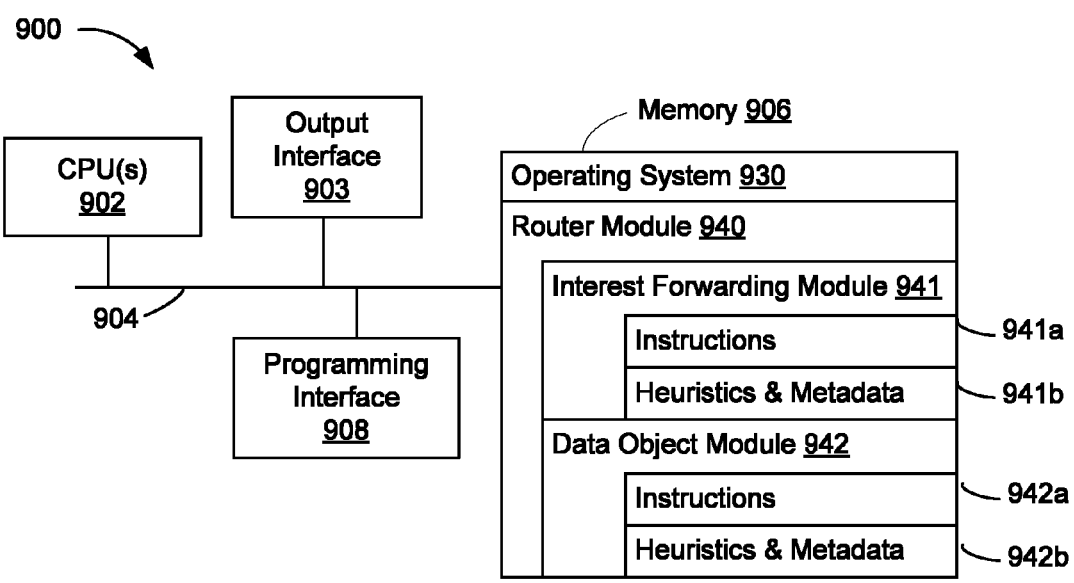
FIG. 9 is a block diagram of a computing device, in accordance with some embodiments.

FIG. 9 is a block diagram of a computing device 900, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a server module 940. In some embodiment, one or more instructions are included in a combination of logic and non-transitory memory. The operating system 930 includes procedures for handling various basic system services and for performing hardware dependent tasks. In some embodiments, the router module 940 may be configured to receive interest messages, transmit interest messages, receive data objects, transmit data objects, generate forwarded interest messages, transmit forwarded interest messages, receive data messages, and transmit data messages. To that end, the router module 940 includes an interest forwarding module 941 and a data object module 942.

In some embodiments, the interest forwarding module 941 may receive interest messages, transmit interest messages, generate forwarded interest messages, and transmit forwarded interest messages. To that end, the interest forwarding module 941 includes a set of instructions 941*a* and heuristics and metadata 941*b*. In some embodiments, the data object module 942 may receive data objects, transmit data objects, receive data messages, and transmit data messages. To that end, the data object module 942 includes a set of instructions 942*a* and heuristics and metadata 942*b*.

Although the router module 940, the interest forwarding module 941, and the data object module 942 are illustrated as residing on a single computing device 900, it should be understood that in other embodiments, any combination of the router module 940, the interest forwarding module 941, and the data object module 942 may reside on separate computing devices.

Moreover, FIGS. 8 through 9 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 8 through 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at a router within an information centric network, the router including one or more processors, non-transitory memory, a data object cache, a first information centric networking (ICN), and a second ICN interface:
        obtaining, via the first ICN interface, a first interest message from a client device comprising a first name of a first data object;
        determining that the first data object is stored within the data object cache of the router based on the first interest message;
        determining whether the first data object stored within the data object cache of the router includes a forwarding parameter, the forwarding parameter indicates that the router is to update and transmit interest messages to a server,
        updating, the first interest message with a cache indicator indicating that the first data object is stored within the data object cache of the router and transmitting, via the second ICN interface, the updated first interest message to the server in response to determining that the first data object stored within the data object cache of the router includes the forwarding parameter to enable the server to control and track dissemination of the content; and
        transmitting, via the first ICN interface, the first data object stored within the data object cache of the router to the client device in response to determining that the first data object stored within the data object cache of the router does not include the forwarding parameter.

2. The method of claim 1, further comprising:
    obtaining the first data object from the server, wherein the first data object includes the forwarding parameter; and
    storing the first data object in the data object cache of the router.

3. The method of claim 2, further comprising:
    transmitting, via the first ICN interface, the first data object to the client device when the first data object is stored within the data object cache of the router includes the forwarding parameter and a data return parameter, wherein the data return parameter indicates that the first data object is to be transmitted to the client device, via the first ICN interface, without waiting for a data message in response to the updated first interest message.

4. The method of claim 1, further comprising:
    transmitting the first interest message, via the second ICN interface, to the server when the first data object is not stored within the data object cache of the router.

5. The method of claim 1, wherein the updated first interest message further comprises a hash of the first data object.

6. The method of claim 5, further comprising:
    determining whether a data message comprising the hash of the first data object is received within a timeout period when the first data object is stored within the cache of the router;
    transmitting, via the first ICN interface, the first data object stored within the data object cache of the router to the client device when the data message is received within the timeout period, wherein the forwarding parameter further indicates that the first data object is to be transmitted after receiving the data message; and
    updating a pending interest table (PIT) to indicate that the first interest message has been satisfied.

7. The method of claim 6, further comprising:
    refraining from transmitting the first data object stored within the data object cache of the router to the client device when the data message is not received within the timeout period.

8. The method of claim 5, further comprising:
    determining whether a data message comprising the hash of the first data object is received within a timeout period when the first data object is stored within the data object cache of the router;
    transmitting, via the first ICN interface, the first data object stored within the data object cache of the router to the client device when the data message is not received within the timeout period, wherein the forwarding parameter further indicates that the first data object is to be transmitted after the timeout period has elapsed; and updating a pending interest table (PIT) to indicate that the first interest message has been satisfied.

9. The method of claim 1, further comprising:
incrementing a hop value indicating a current number of routers between the server and the client device, wherein the cache indicator further comprises the hop value.

10. An apparatus comprising:
a plurality of information centric networking (ICN) interfaces including a first ICN interface and a second ICN interface;
one or more processors; and
a non-transitory memory comprising instructions that when executed by the one or more processors, cause the apparatus to perform operations comprising:
obtaining, via the first ICN interface, a first interest message from a client device comprising a first name of a first data object;
determining that the first data object is stored within the data object cache of apparatus based on the first interest message;
determining whether the first data object stored within the data object cache of the apparatus includes a forwarding parameter, the forwarding parameter indicates that the apparatus is to update and transmit interest messages to a server;
updating, the first interest message with a cache indicator indicating that the first data object is stored within the data object cache of the apparatus and transmitting, via the second ICN interface, the updated first interest message to the server in response to determining that the first data object stored within the data object cache of the apparatus includes the forwarding parameter to enable the server to control and track dissemination of the content; and
transmitting, via the first ICN interface, the first data object stored within the data object cache of the apparatus to the client device in response to determining that the first data object stored within the data object cache of the apparatus does not include the forwarding parameter.

11. The apparatus of claim 10, wherein the instructions cause the apparatus to perform operations further comprising:
obtaining the first data object from the server, wherein the first data object includes the forwarding parameter; and
storing the first data object in the data object cache of the apparatus.

12. The apparatus of claim 11, wherein the instructions cause the apparatus to perform operations further comprising:
transmitting, via the first ICN interface, the first data object to the client device when the first data object is stored within the data object cache of the apparatus includes the forwarding parameter and a data return parameter, wherein the data return parameter indicates that the first data object is to be transmitted to the client device, via the first ICN interface, without waiting for a data message in response to the updated first interest message.

13. The apparatus of claim 10, wherein the instructions cause the apparatus to perform operations further comprising:
transmitting the first interest message, via the second ICN interface, to the server when the first data object is not stored within the data object cache of the apparatus.

14. A non-transitory computer readable medium storing instructions, which, when executed by one or more processors of an apparatus with a data object cache, a first information centric networking (ICN), and a second ICN interface, cause the apparatus to perform operations comprising:
obtaining, via the first ICN interface, a first interest message from a client device comprising a first name of a first data object;
determining that the first data object is stored within the data object cache of the apparatus based on the first interest message;
determining whether the first data object stored within the data object cache of the apparatus includes a forwarding parameter, the forwarding parameter indicates that the apparatus is to update and transmit interest messages to a server;
updating the first interest message with a cache indicator indicating that the first data object is stored within the data object cache of the apparatus and transmitting, via the second ICN interface, the updated first interest message to the server in response to determining that the first data object stored within the data object cache of the apparatus includes the forwarding parameter to enable the server to control and track dissemination of the content; and
transmitting, via the first ICN interface, the first data object stored within the data object cache of the apparatus to the client device in response to determining that the first data object stored within the data object cache of the apparatus does not include the forwarding parameter.

15. The non-transitory computer readable medium of claim 14, wherein the instructions cause the apparatus to perform operations further comprising:
obtaining the first data object from the server, wherein the first data object includes the forwarding parameter; and
storing the first data object in the data object cache of the apparatus.

16. The non-transitory computer readable medium of claim 15, wherein the instructions cause the apparatus to perform operations further comprising:
transmitting, via the first ICN interface, the first data object to the client device when the first data object is stored within the data object cache of the apparatus includes the forwarding parameter and a data return parameter, wherein the data return parameter indicates that the first data object is to be transmitted to the client device, via the first ICN interface, without waiting for a data message in response to the updated first interest message.

17. The non-transitory computer readable medium of claim 14, wherein the instructions cause the apparatus to perform operations further comprising:
transmitting the first interest message, via the second ICN interface, to the server when the first data object is not stored within the data object cache of the apparatus.

18. The non-transitory computer readable medium of claim 14, wherein the updated first interest message further comprises a hash of the first data object, and wherein the instructions cause the apparatus to perform operations further comprising:
determining whether a data message comprising the hash of the first data object is received within a timeout period when the first data object is stored within the cache of the apparatus;

transmitting, via the first ICN interface, the first data object stored within the data object cache of the apparatus to the client device when the data message is received within the timeout period, wherein the forwarding parameter further indicates that the first data object is to be transmitted after receiving the data message; and updating a pending interest table (PIT) to indicate that the first interest message has been satisfied.

19. The non-transitory computer readable medium of claim 18, wherein the instructions cause the apparatus to perform operations further comprising:

refraining from transmitting the first data object stored within the data object cache of the apparatus to the client device when the data message is not received within the timeout period.

20. The non-transitory computer readable medium of claim 14, wherein the updated first interest message further comprises a hash of the first data object, and wherein the instructions cause the apparatus to perform operations further comprising:

determining whether a data message comprising the hash of the first data object is received within a timeout period when the first data object is stored within the data object cache of the apparatus;

transmitting, via the first ICN interface, the first data object stored within the data object cache of the apparatus to the client device when the data message is not received within the timeout period, wherein the forwarding parameter further indicates that the first data object is to be transmitted after the timeout period has elapsed; and updating a pending interest table (PIT) to indicate that the first interest message has been satisfied.

* * * * *